Patented Apr. 11, 1944

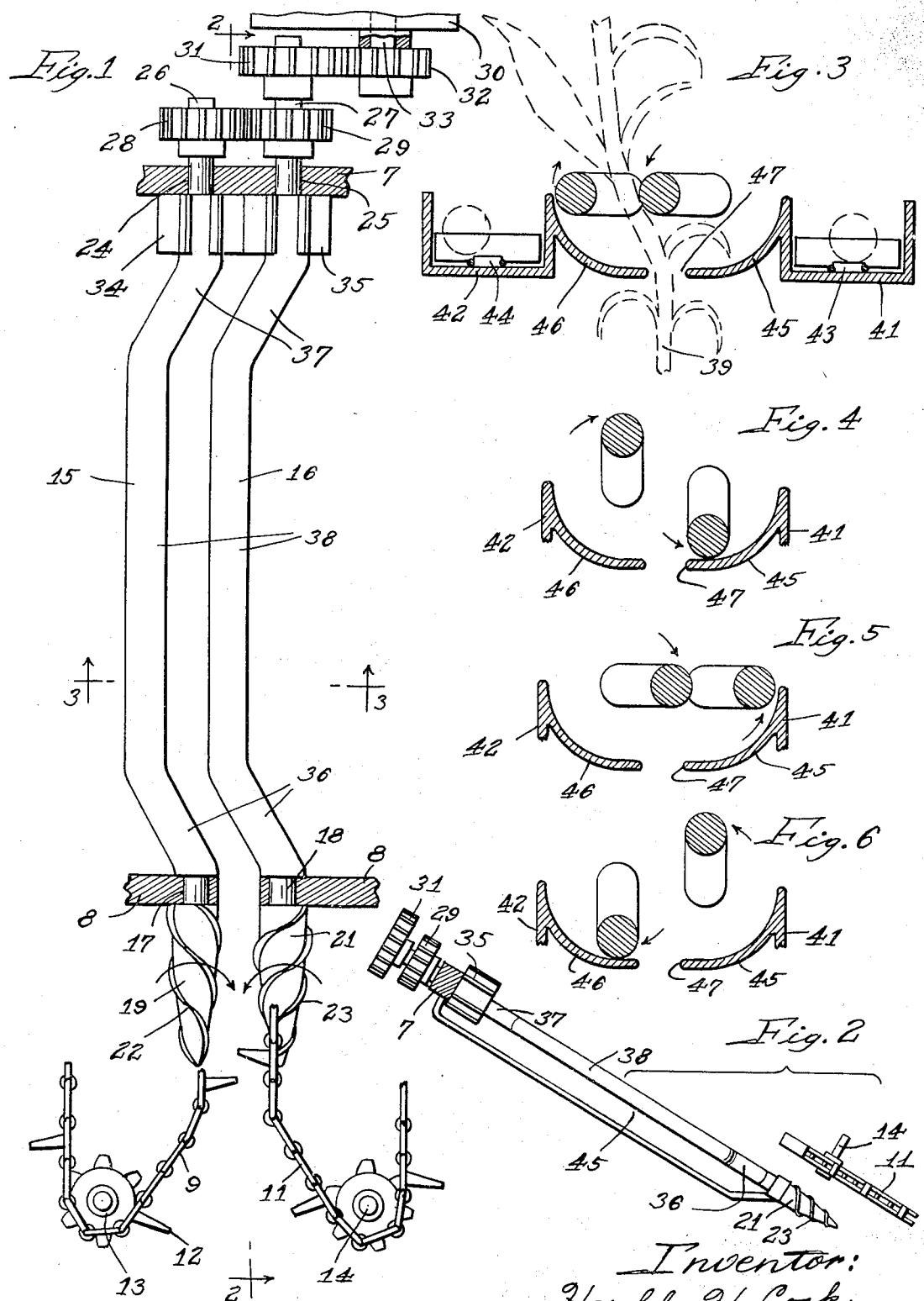

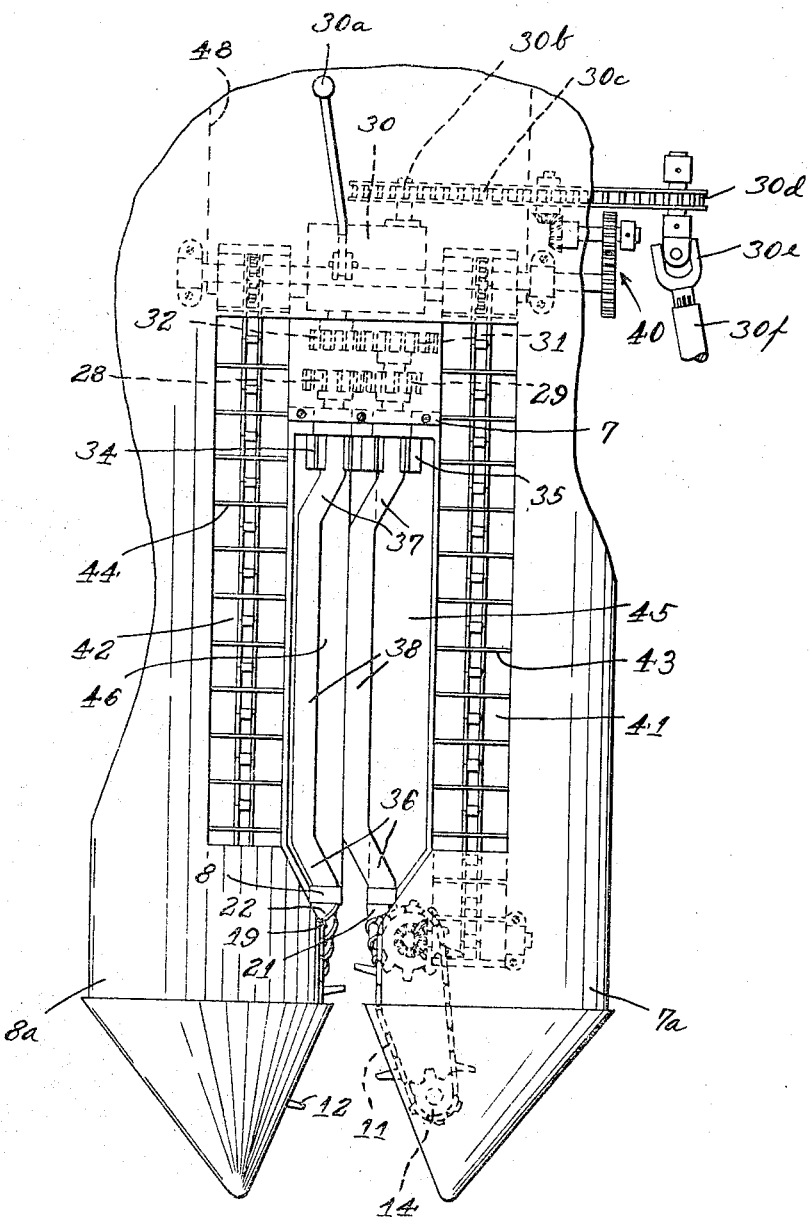

2,346,252

UNITED STATES PATENT OFFICE 2,346,252

CORN PICKER

Harold H. Cook, Steward, Ill.

Application April 21, 1941, Serial No. 389,493

8 Claims. (Cl. 56—103)

This invention relates to the harvesting of corn, and has special reference to an improved method and machine for removing the ears from the stalks while the corn stands in the field.

An important object of the invention is the provision of an improved method of harvesting corn which avoids objectionable features of methods heretofore employed, and the provisions of an improved corn harvester or picker having a novel form of picker roll.

A still further object of the invention is the provision of a novel form of picker roll mechanism.

Other objects and advantages will appear from the following description and the accompanying drawings, in which—

Figure 1 is a top view partly in section showing the snapping roll portion of a corn picker embodying my invention;

Fig. 2 is a view on the line 2—2 of Figure 1 showing the manner in which the snapping rolls are inclined with respect to the surface of the ground;

Fig. 3 is a section on the line 3—3 of Figure 1 showing the picker rolls and the corn conveying mechanism, Figs. 4, 5 and 6 are views similar to Fig. 3 showing moved positions of the rolls.

Fig. 7 is a top view showing the snapping rolls of a corn picker embodying my invention.

The invention contemplates improvement primarily in the snapping rolls of a corn harvesting device, and aside from the snapping roll and directly associated mechanism the invention contemplates the provision of the conventional elements of a corn picker including the usual frame structure, wheels, elevating chains and conveyers for transporting the snapped ears back to a suitable conveyance or compartment as well as the conventional husking rolls where it is desired to include the husking function in the machine, all of these elements being well known in the art. The invention contemplates a new mode or method of removing the ears from the stalk, together with novel snapping rolls and associated elements for performing the method.

In Figures 1 and 7 the numerals 7 and 8 indicate portions of the usual frame structure employed for supporting the snapping rolls, and the numerals 9 and 11 indicate conventional feed-in chains having spurs as indicated at 12 used for guiding the stalks into the area between the snapping rolls. The chains are carried on the usual sprockets 13 and 14 commonly driven from a power take-off or the like and carried on the frame structure in the usual manner. The feed-in chains and much of the other operating mechanism is enclosed in sheet metal enclosures 7a and 8a in accordance with the usual practice in such machines, these enclosures sloping toward the elevator chutes presently to be described.

Snapping rolls, indicated generally by the numerals 15 and 16, are mounted adjacent their front and lower end in the frame section 8 as indicated at 17 and 18 through a conventional type of bearings adapted to support the rolls for rotation. The rolls have forwardly projecting ends 19 and 21 provided with ribs 22 and 23 to assist in guiding the corn stalks into the space between the rolls. The upper and rear ends of the spaced rolls are likewise journalled in the frame section 7 as indicated at 24 and 25 through conventional bearing structures and project therethrough to provide hubs 26 and 27 upon which meshing spur gears 28 and 29 are fixedly mounted. The hub 27 also carries a drive gear 31 meshing with a gear 32 on a drive shaft 33 connected to a suitable source of power through a change speed transmission designated generally by the numeral 30, whereby the snapping rolls are driven in synchronism. While the transmission 30 is shown directly associated with the shaft 33, it will be understood that this relation is shown for convenience and that the transmission can and will be located at a more remote point in the drive and at some point convenient for manual manipulation of a handle or lever 30a of the transmission in order to change the speed of rotation of the rolls to suit the condition of the corn at the time of harvesting. In this instance the transmission is shown as being driven through conventional drive means including a sprocket 30b, chain 30c, and sprocket 30d driven through a universal joint 30e connected by a conventional torque tube 30f to the power take-off of a tractor or other power supply means. The snapping rolls may also be provided with the conventional stalk cutters 34 and 35 positioned adjacent the upper ends of the rolls and forwardly of the frame section 7 so as to cut the stalks and pass them downward through the rolls in a known manner, where other means of disposing of the stalks are not provided. The snapping rolls 15 and 16 are each curved laterally adjacent the bearings 17 and 18 and the bearings 24 and 25 as indicated at 36 and 37 to provide central portions 38 extending with their axes parallel with the axis of rotation thereof. The gears 28 and 29 are set so that the rolls rotate in opposite directions as indicated by the arrows in Figs.

3 to 6, the spacing between the rolls being such as to permit the passage of a corn stalk therebetween in the conventional manner. Thus, as the stalk moves into the rolls, the chains 9 and 11 bring the stalk into the space between the curved portions 36 of the rolls, in which position a slight lateral movement is imparted to the upper portions of the stalk, the stalk indicated diagrammatically at 39, Fig. 3, being, for example, first swung to the left facing this figure in the manner shown. As the rolls continue rotation they reach the position shown in Fig. 3 in which the stalk is upright, and then pass over to the position shown in Fig. 5 in which the stalk is inclined in the opposite direction. With continued rotation of the rolls into the position shown in Fig. 6, the stalk is again brought upright and thence moves back into the position of Fig. 3, the maximum movement of the stalk being produced when it occupies a position between the central portions 38 of the rolls. The speed of rotation of the rolls is such that this movement imparts to the stalk a rapid whipping action, the amplitude and the speed of this movement of the stalk being such as to cause the ears, because of their greater weight and inertia, to be snapped from the stalk much in the manner of flipping fruit from the branch of a tree by shaking the limb.

Positioned on opposite sides of the rolls are elevator chutes indicated generally by the numerals 41 and 42 and driven by conventional gearing 40 as from the chain 30c, and shaped for reception of the ears of corn as they are flipped from the stalk, the elevators having conveyer blades 43 and 44 or equivalent means for conveying the ears upward and backward to conventional husking rolls or a storage compartment indicated diagrammatically by the numeral 48 in the manner conventional in such machines. Advantageously the chutes 41 and 42 are provided with inwardly disposed aprons 45 and 46 providing a centrally disposed slot 47 beneath the center of the rolls, the slot and aprons serving to support the corn stalk in the area below the rotating rolls so as to augment the whipping effect of the rolls on the stalk.

Attention is directed to the fact that I have provided a new and novel method for removing the ears of corn from the stalk which includes the steps of whipping the corn stalk violently back and forth until the heavier portion, namely, the ears, are severed from the stalk and drop into the elevators. This is accomplished by using eccentric or off-center rolls between which the corn stalks are caused to move by movement of the harvesting machine along the row. Among the important advantages resulting from this method is that it enables a corn harvesting machine to satisfactorily perform work which heretofore has been done mostly by hand. An example of such work is the snapping of green sweet corn for factory canning operations. When the conventional corn harvesting machine using the ordinary snapping rolls is employed, difficulty arises because such rolls operate on the principle of squeezing the ear off from the stalk. With the smaller soft green ears of sweet corn, such rolls tend to squeeze the ears through and between the rolls without separating the ear from the stalk. The squeezing operation also damages the butts of the larger ears where they are pinched during the process of separating them from the stalk. As a result, the canning companies have been unable to satisfactorily use these machines for the harvesting of sweet corn, and such harvesting has in the past almost universally been done by hand. On the other hand, the eccentric or off-center rolls of this invention act on the ears and stalk on a different principle and are broken from the stalk by whipping the stalk between the snapping rolls.

I have also provided means for varying the speed of rotation of the snapping rolls in order to obtain the best results under different conditions of operation. For example, in the morning when the air is cool and the dew is on the stalks, the ears break off easily, and if the stalks are then whipped too violently there is a tendency for increased breakage on the part of the stalks, and on the other hand, in the afternoon, when the air is dry and the sun is hot, the stalks and the shank of the ears become tough and ropy and more violent whipping is needed in order to produce the best results. This change in operating conditions is brought about by adjusting the speed of rotation of the rolls so as to adjust the degree of the whipping action.

While I have herein shown the snapping rolls as having a smooth surface, it will be obvious that for special purposes the surfaces may be provided with roughened configurations within the scope of the invention, and likewise the particular curvature of the snapping rolls may be varied, the essential thing being to impart to the stalk a whipping action such as to cause the ears to be flipped therefrom and thereby severed from the stalk.

I claim:

1. The combination in a corn harvesting machine of rotatable picker rolls spaced for the reception of standing corn stalks therebetween as the machine is moved along a corn row, said rolls being laterally offset intermediate their ends, and means for rotating said rolls in synchronism to impart a reciprocating motion to the corn stalks disposed between said offset portions to shake the ears of corn therefrom.

2. The combination in a corn harvesting machine of rotatable picker rolls spaced for the reception of standing corn stalks therebetween as the machine is moved along a corn row, said rolls being laterally offset intermediate their ends, means for rotating said rolls in synchronism to impart a reciprocating motion to the corn stalks disposed between said offset portions to shake the ears of corn therefrom, and means for driving said rolls at any of a plurality of speeds.

3. The combination in a corn harvesting machine of rotatable picker rolls spaced for the reception of standing corn stalks therebetween as the machine is moved along a corn row, said rolls being laterally offset intermediate their ends, means for rotating said rolls in synchronism to impart a reciprocating motion to the corn stalks disposed between said offset portions to shake the ears of corn therefrom, and means for receiving said ears and conveying the same to a remote point.

4. The combination in a corn harvester of a pair of picker elements adapted to be moved along a row of ear-bearing cornstalks, means for supporting said picker elements in said harvester in spaced, side by side relation to each other to receive said stalks therebetween, each of said picker elements having stalk-engaging portions extending longitudinally thereof, means for driving said stalk-engaging portions to move the same toward and away from said stalks in timed relation so that as one of said stalk-engaging portions is moving toward said stalks to strike said stalks below said ears, the other of said stalk-engaging portions is moving away from said stalks and vice versa, whereby to alternately strike said stalks on opposite sides thereof to cause said ears to snap off through the inertia of said ears as said stalks change their state of movement.

5. In a harvesting machine adapted to be moved along a row of ear-bearing cornstalks, a pair of picker elements arranged to receive said stalks therebetween, means for supporting said picker elements in spaced, side by side relation to each other and including stalk-engaging portions extending longitudinally thereof inclined rearwardly and upwardly so as to move progressively up along said stalks with forward progress of the machine, said stalk-engaging portions being movable toward and away from said stalks in timed relation so that as one of said stalk-engaging portions is moving toward said stalks to strike said stalks below said ears, the other of said stalk-engaging portions is moving away from said stalks and vice versa, whereby to alternately strike said stalks on opposite sides thereof and cause said ears to snap off through the inertia of said ears as said stalks change their direction of movement, and means for actuating said picker elements in timed relation.

6. In a harvesting machine adapted to be moved along a row of ear-bearing cornstalks, a pair of picker elements arranged to receive said stalks therebetween, means for supporting said picker elements in spaced, side by side relation to each other and including stalk-engaging portions extending longitudinally thereof inclined rearwardly and upwardly so as to move progressively up along said stalks with forward progress of the machine, said stalk-engaging portions being movable toward and away from said stalks in timed relation so that as one of said stalk-engaging portions is moving toward said stalks to strike said stalks below said ears, the other of said stalk-engaging portions is moving away from said stalks and vice versa, whereby to alternately strike said stalks on opposite sides thereof to cause said ears to snap off through the inertia of said ears and prior to physical contact of the picker elements therewith, and means for driving said picker elements in synchronism at any of a plurality of different speeds selectable by the operator dependent upon the condition of the corn.

7. In a harvesting machine adapted to be moved along a row of ear-bearing cornstalks, a pair of picker elements arranged to receive said stalks therebetween, means for supporting said picker elements in spaced, side by side relation to each other and including stalk-engaging portions extending longitudinally thereof inclined rearwardly and upwardly so as to move progressively up along said stalks with forward progress of the machine, said stalk-engaging portions being movable toward and away from said stalks in timed relation so that as one of said stalk-engaging portions is moving toward said stalks to strike said stalks below said ears, the other of said stalk-engaging portions is moving away from said stalks and vice versa, whereby to alternately strike said stalks on opposite sides thereof to cause said ears to snap off through the inertia of said ears prior to physical contact of the picker elements therewith, spaced apron means below said picker elements providing a slot to receive said cornstalks therebetween and arranged to serve as a support for said stalks while said picker elements strike the opposite sides of said stalks, and means for actuating said picker elements in timed relation.

8. In a harvesting machine adapted to be moved along a row of ear-bearing cornstalks, a pair of picker elements arranged to receive said stalks therebetween, means for supporting said picker elements in spaced, side by side relation to each other and including stalk-engaging portions extending longitudinally thereof inclined rearwardly and upwardly so as to move progressively up along said stalks with forward progress of said machine, said stalk-engaging portions being movable toward and away from said stalks in timed relation so that as one of said stalk-engaging portions is moving toward said stalks to strike said stalks below said ears, the other of said stalk-engaging portions is moving away from said stalks and vice versa, whereby to alternately strike said stalks on opposite sides thereof to cause said ears to snap off prior to physical contact of the picker elements therewith, means for driving said picker elements in timed relation at any of a plurality of different speeds selectable by the operator dependent upon the condition of the corn, means for catching the ears as they are shaken from the stalks, and means for conveying the ears to a remote point.

HAROLD H. COOK.